US010995158B2

(12) United States Patent
Lecouvet et al.

(10) Patent No.: US 10,995,158 B2
(45) Date of Patent: May 4, 2021

(54) PROCESS FOR MANUFACTURE OF LOW EMISSION HETEROPHASIC POLYPROPYLENE

(71) Applicant: SABIC GLOBAL TECHNOLOGIES B.V., Bergen op Zoom (NL)

(72) Inventors: Benoit Therese Philippe Lecouvet, Geleen (NL); Christelle Marie Helene Grein, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 89 days.

(21) Appl. No.: 16/468,091

(22) PCT Filed: Dec. 12, 2017

(86) PCT No.: PCT/EP2017/082464
§ 371 (c)(1),
(2) Date: Jun. 10, 2019

(87) PCT Pub. No.: WO2018/108935
PCT Pub. Date: Jun. 21, 2018

(65) Prior Publication Data
US 2019/0330386 A1 Oct. 31, 2019

(30) Foreign Application Priority Data
Dec. 12, 2016 (EP) .................... 16203443

(51) Int. Cl.
C08F 2/34 (2006.01)
C08F 2/01 (2006.01)
C08F 210/06 (2006.01)
C08F 210/16 (2006.01)
C08L 23/12 (2006.01)
C08F 2/00 (2006.01)
C08F 4/654 (2006.01)
C08F 4/656 (2006.01)
C08L 23/08 (2006.01)
C08L 23/14 (2006.01)

(52) U.S. Cl.
CPC .............. C08F 2/34 (2013.01); C08F 2/001 (2013.01); C08F 4/6548 (2013.01); C08F 4/6565 (2013.01); C08F 210/06 (2013.01); C08F 210/16 (2013.01); C08L 23/0815 (2013.01); C08L 23/12 (2013.01); C08L 23/142 (2013.01); C08L 2205/02 (2013.01); C08L 2207/02 (2013.01)

(58) Field of Classification Search
CPC ........ C08F 2/34; C08F 210/16; C08F 4/6548; C08F 2/001; C08F 4/6465; C08F 4/02;
C08F 2500/12; C08L 23/0815; C08L 23/14; C08L 23/12; C08L 23/142; C08L 2205/02; C08L 2207/02
USPC ......................................... 526/65
See application file for complete search history.

(56) References Cited

U.S. PATENT DOCUMENTS

| 3,957,448 | A | 5/1976 | Shepard et al. |
| 4,282,076 | A | 8/1981 | Boynton |
| 4,771,024 | A | 9/1988 | Nestlerode et al. |
| 4,866,022 | A | 9/1989 | Arzoumanidis et al. |
| 5,093,415 | A | 3/1992 | Brady, III et al. |
| 6,218,504 | B1 | 4/2001 | Dolle et al. |
| 6,395,670 | B1 | 5/2002 | Morini et al. |
| 6,825,146 | B2 | 11/2004 | Kilty et al. |
| 2009/0306315 | A1 | 12/2009 | Ramjoie et al. |
| 2016/0152810 | A1* | 6/2016 | Resconi .......... C08L 23/10 525/240 |
| 2016/0311950 | A1 | 10/2016 | Batinas-Geurts et al. |

FOREIGN PATENT DOCUMENTS

| EP | 0019330 A | 11/1980 |
| EP | 0063654 A1 | 11/1982 |
| EP | 0398698 A2 | 11/1990 |
| EP | 0799839 A2 | 10/1997 |
| EP | 1273595 A1 | 1/2003 |
| EP | 1980576 A1 | 10/2008 |
| EP | 1838741 B1 | 4/2011 |
| GB | 1272778 A | 5/1972 |

(Continued)

OTHER PUBLICATIONS

European Search Report; European Application No. 16203443.3; Filing Date: Dec. 12, 2016; 3 pages.

(Continued)

Primary Examiner — William K Cheung
(74) Attorney, Agent, or Firm — Cantor Colburn LLP

(57) ABSTRACT

The invention relates to a process for the preparation of a heterophasic propylene copolymer consisting of a propylene-based matrix and a dispersed ethylene-α-olefin copolymer, comprising the steps of a) preparing the propylene-based matrix from propylene and optionally a C2 or C4-C12 α-olefin by contacting at least propylene and optionally C2 or C4-C12 a-olefin with a catalyst in a first gas-phase reactor at a temperature T1 and a pressure P1, b) subsequently preparing the dispersed ethylene-α-olefin copolymer from ethylene and a C3-C12 α-olefin by contacting the ethylene and the C3-C12 α-olefin with a catalyst in a second gas-phase reactor at a temperature T2 and a pressure P2, wherein T1-T2 is in the range from 6 to 25° C., wherein T1>T2, wherein Pl and P2 are in the range from 22 to 30 bar to prepare a heterophasic propylene copolymer (A').

17 Claims, No Drawings

(56) References Cited

FOREIGN PATENT DOCUMENTS

| WO | 9632426 A1 | 10/1996 |
|----|------------|---------|
| WO | 02088194 A1 | 11/2002 |
| WO | 2004039848 A1 | 5/2004 |
| WO | 2006056338 A1 | 6/2006 |
| WO | 2007134851 A1 | 11/2007 |
| WO | 2008015113 A2 | 2/2008 |
| WO | 2009080821 A2 | 7/2009 |
| WO | 2015091151 A1 | 6/2015 |
| WO | 2015091810 A1 | 6/2015 |
| WO | 2015150042 A1 | 10/2015 |
| WO | 2016198344 A1 | 12/2016 |

OTHER PUBLICATIONS

International Search Report; International Application No. PCT/EP2017/082464; International Filing Date: Dec. 12, 2017; dated Mar. 14, 2018; 5 pages.
Periodic System of the Elements (Handbook of Chemistry and Physics, 70th Edition; CRC Press, 1989-1990 (1 page).
Soares et al. "Particle Growth and Single Particle Modeling" Polyolefin Reaction Engineering, First Edition, Chapter 7, 2012, pp. 1-39.
Soares et al. "Polyolefin Reactors and Processes" Polyolefin Reaction Engineering, First Edition, Chapter 4, 2012, pp. 1-43.
Written Opinion; International Application No. PCT/EP2017/082464; International Filing Date: Dec. 12, 2017; dated Mar. 14, 2018; 7 pages.

\* cited by examiner

PROCESS FOR MANUFACTURE OF LOW EMISSION HETEROPHASIC POLYPROPYLENE

CROSS REFERENCE TO RELATED APPLICATIONS

This application is a 371 of International Application No. PCT/EP2017/082464, filed Dec. 12, 2017, which is incorporated by reference in its entirety, and which claims priority to European Application Serial No. 16203443.3, filed Dec. 12, 2016.

The present invention relates to a process for the manufacture of a heterophasic propylene copolymer, a heterophasic propylene copolymer obtained or obtainable by said process and to the use of said heterophasic propylene copolymer, preferably in automotive interior applications.

Heterophasic propylene copolymers, also known as impact propylene copolymers or propylene block copolymers, are an important class of polymers due to their attractive combination of mechanical properties, such as impact strength over a wide temperature range and their low cost. These copolymers find a wide range of applications ranging from the consumer industry (for example packaging and housewares), the automotive industry to electrical applications. One of the requirements for propylene polymers such as heterophasic propylene copolymers in automotive interior applications is that it has a relatively low emission of low molecular weight materials. In other words, such propylene polymers may contain only a very low amount of low molecular weight oligomers, because such low molecular weight materials may cause an unpleasant odor, a sticky feeling of the surface or may condense against windscreens thereby causing a reduced visibility.

One of the requirements related to such emission is laid down in the VDA 278 standard. The emission as determined in that standard is referred to as the FOG value. For example car manufacturers may require that the FOG value is typically at most 500 µg/g, more in particular at most 400 µg/g. With requirements becoming more strict in future, even lower FOG values such as FOG values of at most 350 µg/g or even at most 250 µg/g may become desirable.

Currently a method for reducing FOG emission involves maintaining polypropylene pellets or powders at a certain elevated temperature for a certain amount of time. For example polypropylene pellets or powders may be continuously fed to the top of a silo where the polypropylene is preferably contacted in counter-flow with a stream of hot gas, which may be for example nitrogen or dried air. At the bottom of the silo polypropylene having a reduced FOG value is then continuously withdrawn. This process is often referred to as venting, degassing or purging. It is noted that this venting, degassing or purging should not be confused with the removal of unreacted monomer as is usually carried out directly after polymerisation.

Venting, degassing or purging processes are disclosed for example in GB 1272778, WO 02/088194, WO2004/039848 and U.S. Pat. No. 6,218,504. Other methods to remove low molecular weight materials also exist, among which are steam stripping or chemical treatment.

A special process for venting is disclosed in WO2015/150042A1, which discloses a method for manufacture of a polypropylene having a target melt flow rate of from 10 to 200 g/10 min as determined in accordance with ISO1133 (230° C., 2.16 kg) comprising the sequential steps of
i) Polymerizing the propylene monomer, an optionally one or more alpha olefin comonomers so as to form a polypropylene having an initial melt flow rate of from 0.5 to 20 g/10 min (ISO1133, 230° C., 2.16 kg),
ii) Visbreaking said polypropylene of step i) to obtain polypropylene having said target melt flow rate and wherein the ratio of target to initial melt flow rate is more than 1
iii) Maintaining the polypropylene obtained from step ii) at a temperature of at least 105° C. for a period of at least 48 hr.

A disadvantage of a venting step is that such an extra step adds cost to the final heterophasic propylene copolymer product. In particular it is noted that heterophasic propylene copolymers having a relatively high initial FOG value generally need to be maintained for a longer period of time in the venting equipment. Such a longer residence time not only increases the overall cost, but may also have a negative effect on the optical properties of the material in that the heterophasic propylene copolymer suffers from more yellowing due to partial thermal degradation.

It is therefore an object of the present invention to provide a process for the preparation of a heterophasic propylene copolymer having low FOG values.

Accordingly, the present invention provides a process for the preparation of a heterophasic propylene copolymer consisting of a propylene-based matrix and a dispersed ethylene-α-olefin copolymer, comprising the steps of
a) preparing the propylene-based matrix from propylene and optionally a C2 or C4-C12 α-olefin by contacting at least the propylene and optionally C2 or C4-C12 α-olefin with a catalyst in a first gas-phase reactor at a temperature T1 and a pressure P1
b) subsequently preparing the dispersed ethylene-α-olefin copolymer from ethylene and a C3-C12 α-olefin by contacting the ethylene and the C3-C12 α-olefin with a catalyst in a second gas-phase reactor at a temperature T2 and a pressure P2
wherein T1−T2 is in the range from 6 to 25° C., wherein T1>T2
wherein P1 and P2 are in the range from 22 to 30 bar
to prepare a heterophasic propylene copolymer (A').

Generally, in a process for the production of a heterophasic propylene copolymer comprising the steps of
a) preparing the propylene-based matrix from propylene and optionally a C2 or C4-C12 α-olefin by contacting at least the propylene and optionally C2 or C4-C12 α-olefin with a catalyst in a first gas-phase reactor at a temperature T1 and a pressure P1
and
b) subsequently preparing the dispersed ethylene-α-olefin copolymer from ethylene and a C3-C12 α-olefin by contacting the ethylene and the C3-C12 α-olefin with a catalyst in a second gas-phase reactor at a temperature T2 and a pressure P2, T2 and T1 as well as the pressure P1 and P2 are similar or at least very close together.

It is generally avoided to use a too high T1, since then the catalyst activity is believed to become too high, which will result in fouling of the first gas phase reactor (caused by the production of fines or even lumps) as well as less residual catalyst activity in the second reactor to incorporate the target amount of ethylene-α-olefin copolymer, which cannot be compensated by using a higher temperature in the second reactor as powder stickiness is then likely to occur.

However, it has been found that in the process of the invention, wherein T1−T2 is in the range from 6 to 25° C., wherein T1>T2, it is possible to produce heterophasic propylene copolymers having decreased FOG values.

Several documents are known which indicate that it is possible to vary the reaction temperature over two reactors, or over one (divided) reactor containing two or more compartments with different polymerization temperatures and production rates.

For example, U.S. Pat. No. 3,957,448A discloses an apparatus for the vapor phase polymerization of at least one polymerizable monomer comprising: a. a horizontal reactor of substantially circular cross-section containing a centrally located drive shaft extending longitudinally through said reactor to which are attached a plurality of adjacently located paddles, which paddles cause essentially no forward or backward movement of the particulate matter contained in said reactor and extend transversely within and to a short distance from the internal surfaces of said reactor, said reactor being divided into two or more individually gas-composition-controllable and polymerization-temperature controllable polymerization compartments by one or more dividing structures so constructed to control gas intermixing and movement of said particulate between said compartments; b. driving means for said drive shafts; d. one or more reactor off-gas outlets in each of said compartments spaced along the topward part of said reactor; d. one or more vapor recycle inlets in each of said compartments spaced along the bottomward part of said reactor; e. one or more catalyst addition inlets spaced along said reactor; f. a plurality of quench liquid inlets spaced along the topward part of said reactor whereby quench liquid can be introduced into said two or more compartments; and g. take-off means for said particulate matter at one end of said reactor.

EP 1980576A shows in its examples a process to produce heterophasic propylene copolymers wherein in the first reactor the temperature used is 65° C. (T1) and wherein in the second reactor the temperature used is 60° C. (T2). However, EP1980576 does not mention any advantages to use a temperature difference of at least 6° C., wherein the temperature of the first reactor is higher then the temperature of the second reactor.

However, none of these documents discloses a T1–T2 is in the range from 6 to 25° C., wherein T1>T2 and furthermore, neither do these documents disclose that such temperature difference has the effect of reducing the FOG value of the heterophasic propylene copolymer thus produced.

The pressure of the first gas phase reactor (P1) and of the second gas phase reactor (P2) are in principal not critical and may be chosen in the range from 22 to 30 bar.

According to the process of the invention T1–T2 is in the range from 6 to 25° C., wherein T1>T2.

Preferably, the first gas phase reactor and the second gas phase reactor are connected in series.

The person skilled in the art is aware of what type of gas phase reactors are suitable for the preparation of heterophasic propylene copolymers. For example, Polyolefin Reaction Engineering by J. B. P. Soares and T. F. L. McKenna, July 2012 gives an overview of reactor and processes in Chapter 4. Polyolefin Reactors and Processes. In a preferred embodiment of the invention, the first and second gas-phase reactors are horizontal stirred gas-phase reactors.

Heterophasic Propylene Copolymer (A')

Preferably, the melt flow rate of the heterophasic propylene copolymer (A') is in the range of 1.0 to 20.0 dg/min as measured according to ISO1133 (2.16 kg, 230° C.) and/or wherein the FOG value of the heterophasic propylene copolymer (A') is at most 500 µg/g, preferably at most 400 µg/g, more preferably at most 300 µg/g as determined by VDA 278.

For example, the melt flow rate of the heterophasic propylene copolymer (A') (also referred to herein as intermediate heterophasic propylene copolymer) is at most 30 dg/min, more preferably at most 20 dg/min, more preferably at most 15 dg/min (ISO 1133, 230° C., 2.16 kg). Preferably, the melt flow rate of the intermediate heterophasic propylene copolymer is at least 2 dg/min, preferably at least 3 dg/min, preferably at least 4 dg/min, preferably at least 5 dg/min, or preferably at least 7 dg/min, for example at least 9 dg/min or at least 10 dg/min.

For example, the propylene-based matrix of the intermediate propylene copolymer (A') has a melt flow rate of at most 70 dg/min, preferably at most 60 dg/min, preferably at most 50 dg/min, preferably at most 45 dg/min, preferably at most 40 dg/min, preferably at most 35 dg/min, preferably at most 30 dg/min, most preferably at most 25 dg/min, for example at most 20 dg/min and for example at least 15 dg/min. This is advantageous for low emission of the final heterophasic propylene composition since the amount of low molecular weight oligomers increases with increasing the melt flow rate of the propylene-based matrix. Preferably, the propylene-based matrix of the heterophasic propylene copolymer (A') has a melt flow rate of at least 2 dg/min, at least 3 dg/min, at least 4 dg/min, at least 5 dg/min or for example at least 10 dg/min, for example at least 15 dg/min. For example, the propylene-based matrix of the heterophasic propylene copolymer (A') may have a melt flow rate in the range from 7 to 15 dg/min.

For example, the propylene-based matrix has a melt flow rate in the range from 55-85 g/10 min or for example for in the range from 50 to 80 g/10 min.

However, in the process of the invention, the propylene-based matrix may also have a relatively high melt flow rate of for example at least 150 dg/min, preferably at least 160 dg/min, more preferably at least 180 dg/min or even more preferred at least 200 dg/min, 210 dg/min or 220 dg/min. This has an advantage of good processability, high throughput and/or reduction of cycle times when the heterophasic propylene copolymer is processed using for example injection molding. For example, the propylene-based matrix has a melt flow rate of at most 300, at most 250. For example, the propylene-based matrix has a melt flow rate in the range from 180-230 dg/min.

For example, the dispersed ethylene α-olefin copolymer of the heterophasic propylene copolymer (A') has a melt flow rate of at least 0.001 dg/min, at least 0.01 dg/min, at least 0.1 dg/min, at least 0.3 dg/min, at least 0.7 dg/min, at least 1 dg/min, and/or for example at most 10 dg/min, at most 5 dg/min or at most 3 dg/min. For example, the dispersed ethylene α-olefin copolymer of the heterophasic propylene copolymer (A') has a melt flow index of from 2.5-4.0 g/10 min or from 0.050-0.30 g/10 min.

For purpose of the invention, melt flow rate (MFR) is measured according to ISO1133 (2.16 kg/230° C.).

Preferably, the heterophasic propylene copolymer (A') has a FOG value of at most 500 µg/g, preferably at most 400 µg/g, more preferably at most 300 µg/g as determined by VDA 278. The skilled person will understand that the term µg/g means micrograms of low molecular weight components per gram of polypropylene.

In one embodiment, the temperature T1 in the first gas-phase reactor is in the range from 60 to 75° C., preferably in the range from 65 to 72° C.

In another embodiment, the temperature T1 in the first gas-phase reactor is in the range from 70 to 85° C., preferably in the range from 73 to 80° C.

For example, the temperature T2 in the second gas-phase reactor is in the range from 58 to 70° C., for example in the range of 60 to 65° C.

For example, in the process of the invention, in step a) the propylene-based matrix may be prepared by contacting the propylene, optional C2 or C4-C12 α-olefin and a prepolymer in the first gas phase reactor, wherein the prepolymer is prepared by contacting propylene and optional C2 or C4-C12 α-olefin with a catalyst in a prepolymerization reactor.

Polyolefin Reaction Engineering by J. B. P. Soares and T. F. L. McKenna, July 2012, describes in Chapter 7. Particle growth and single particle modelling that "One common way of avoiding loss of control over the reaction and the morphology at this point is the use of a prepolymerization step. Doing this allows us to produce polymer at a reasonable rate, generating just enough stress that the particles fragment but not so much and not too quickly that they disintegrate. In addition, it has the benefit that particles are grown to a size large enough that heat and mass transfer limitations are eliminated, or at least reduced to manageable levels. Finally, it appears that prepolymerization also helps to increase the activity of the catalyst in the main reactor with respect to nonprepolymerized ones. Prepolymerization refers to the act of injecting the catalyst powder into a reactor that operates under relatively mild conditions (a few bars of monomer at most and occasionally a lower temperature) and produces in the order of 10-100 g of polymer per gram of catalyst. The prepolymerized powder is then injected into the main reactor train. Prepolymerization is typically carried out in slurry conditions even if the main reactor is a gas-phase one and is done in a reactor that is significantly smaller than the main reactor(s)."

In a special embodiment, therefore, in step a) the propylene-based matrix is prepared by contacting the propylene, optional α-olefin and a prepolymer in the first gas phase reactor, wherein the prepolymer is preferably prepared by contacting propylene and optional α-olefin with a catalyst in a prepolymerization reactor and the temperature T1 in the first gas-phase reactor is in the range from 70 to 85° C., preferably in the range from 73 to 80° C.

Catalyst System

The heterophasic polypropylene copolymer (A') may be prepared by contacting the propylene and the optional α-olefin with a catalyst system. Examples of catalyst systems are known to the person skilled in the art and include Ziegler Natta and metallocene based catalyst systems.

In the process of the invention, step a) and/or step b) may be performed by contacting propylene and the optional α-olefin with a catalyst system, preferably a catalyst system which comprises a Ziegler-Natta catalyst and at least one external electron donor, which external electron donor is preferably chosen from the group of a compound having a structure according to Formula III $(R^{90})_2N-Si(OR^{91})_3$, a compound having a structure according to Formula IV: $(R^{92})Si(OR^{93})_3$ and mixtures thereof wherein each of $R^{90}$, $R^{91}$, $R^{92}$ and $R^{93}$ groups are each independently a linear, branched or cyclic, substituted or unsubstituted alkyl having between 1 and 10 carbon atoms, preferably wherein $R^{90}$, $R^{91}$, $R^{92}$ and $R^{93}$ groups are each independently a linear unsubstituted alkyl having between 1 and 8 carbon atoms, for example ethyl, methyl or n-propyl, for example diethylaminotriethoxysilane (DEATES), n-propyl triethoxysilane, (nPTES), n-propyl trimethoxysilane (nPTMS); and organosilicon compounds having general formula $Si(OR^a)_{4-n}R^b_n$, wherein n can be from 0 up to 2, and each of $R^a$ and $R^b$, independently, represents an alkyl or aryl group, optionally containing one or more hetero atoms for instance O, N, S or P, with, for instance, 1-20 carbon atoms; such as diisobutyl dimethoxysilane (DiBDMS), t-butyl isopropyl dimethyxysilane (tBuPDMS), cyclohexyl methyldimethoxysilane (CHMDMS), dicyclopentyl dimethoxysilane (DCPDMS) or di(iso-propyl) dimethoxysilane (DiPDMS). More preferably, the external electron donor is chosen from the group of di(iso-propyl) dimethoxysilane (DiPDMS), diethylaminotriethoxysilane (DEATES), n-propyl triethoxysilane, (nPTES), n-propyl trimethoxysilane (nPTMS) and mixtures thereof.

Preferably, step a) and b) of the process of the invention are performed by contacting propylene and the optional α-olefin with the same catalyst system.

Such organosilicon compounds mentioned above are known in the art (for instance as disclosed in documents WO2006/056338A1, EP1838741B1, U.S. Pat. No. 6,395, 670B1, EP398698A1, WO96/32426A).

Preferably, the catalyst system used, is obtained by a catalyst preparation process comprising the steps of:
  providing a magnesium-based support;
  optionally activating said magnesium-based support using an activator;
  contacting said magnesium-based support with a Ziegler-Natta type catalytic species, and optionally one or more internal electron donors to yield a procatalyst, and
  contacting said procatalyst with a co-catalyst and at least one external electron donor;

More preferably, the catalyst system is obtained by
a catalyst preparation process comprising the steps of:
A) providing a procatalyst obtainable via a process comprising the steps of:
  i) contacting a compound $R^4_z MgX^4_{2-z}$ with an alkoxy- or aryloxy-containing silane compound to give a first intermediate reaction product, being a solid $Mg(OR^1)_x X^1_{2-x}$, wherein: $R^4$ is the same as $R^1$ being a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has between 1 and 20 carbon atoms; $X^4$ and $X^1$ are each independently selected from the group consisting of fluoride (F—), chloride (Cl—), bromide (Br—) or iodide (I—), preferably chloride; z is in a range of larger than 0 and smaller than 2, being $0<z<2$;
  ii) optionally contacting the solid $Mg(OR^1)_x X_{2-x}$ obtained in step i) with at least one activating compound selected from the group formed of activating electron donors and metal alkoxide compounds of formula $M^1(OR^2)_{v-w}(OR^3)_w$ or $M^2(OR^2)_{v-w}(R^3)_w$, to obtain a second intermediate product; wherein $M^1$ is a metal selected from the group consisting of Ti, Zr, Hf, Al or Si; $M^2$ is a metal being Si; v is the valency of $M^1$ or $M^2$; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has between 1 and 20 carbon atoms;
  iii) contacting the first or second intermediate reaction product, obtained respectively in step i) or ii), with a halogen-containing Ti-compound and optionally an internal electron donor to obtain said procatalyst;

B) contacting said procatalyst with a co-catalyst and the at least one external electron donor to form a catalyst;

Preferably in step i) of said process, the compound of formula $R^4_z MgX^4_{2-z}$ is a phenyl or butyl Grignard reagent (PhMgCl or BuMgCl), more preferably a BuMgCl.

The aluminum/external donor molar ratio in the catalyst system preferably is between 0.1 and 200; more preferably between 1 and 100. In a Ti-based catalyst, the Si/Ti molar ratio in the catalyst system can range from 0.1 to 40, preferably from 0.1 to 20, even more preferably from 1 to 20 and most preferably from 2 to 10.

Some examples of Ziegler-Natta (pro)catalysts and their preparation method can be found in EP 1 273 595, EP 0 019 330, U.S. Pat. No. 5,093,415, Example 2 of U.S. Pat. Nos. 6,825,146, 4,771,024 column 10, line 61 to column 11, line 9, WO03/068828, U.S. Pat. No. 4,866,022, WO96/32426A, example I of WO 2007/134851 A1, all of which are hereby incorporated by reference.

The procatalyst thus prepared can be used in polymerization of olefins using an external donor and a co-catalyst.

The catalyst system according to the present invention includes a co-catalyst. As used herein, a "co-catalyst" is a term well-known in the art in the field of Ziegler-Natta catalysts and is recognized to be a substance capable of converting the procatalyst to an active polymerization catalyst. Generally, the co-catalyst is an organometallic compound containing a metal from group 1, 2, 12 or 13 of the Periodic System of the Elements (Handbook of Chemistry and Physics, 70th Edition, CRC Press, 1989-1990). The co-catalyst may include any compounds known in the art to be used as "co-catalysts", such as hydrides, alkyls, or aryls of aluminum, lithium, zinc, tin, cadmium, beryllium, magnesium, and combinations thereof. The co-catalyst may be a hydrocarbyl aluminum co-catalyst as are known to the skilled person. Preferably, the cocatalyst is selected from trimethylaluminium, triethylaluminum, triisobutylaluminum, trihexylaluminum, di-isobutylaluminum hydride, tri-octylaluminium, dihexylaluminum hydride and mixtures thereof, most preferably, the cocatalyst is triethylaluminium (abbreviated as TEAL).

The molar ratio of aluminum to titanium may be from about 5:1 to about 500:1 or from about 10:1 to about 200:1 or from about 15:1 to about 150:1 or from about 20:1 to about 100:1. The molar ratio of aluminum to titanium is preferably about 45:1. The aluminium/external donor molar ratio in the polymerization catalyst system preferably is from 0.1 to 200; more preferably from 1 to 100.

The internal electron donor can be any compound known in the art to be used as internal electron donor. Suitable examples of internal donors include aromatic acid esters, such as monocarboxylic acid ester or dicarboxylic acid esters (e.g. ortho-dicarboxylic acid esters such as phthalic acid esters) or benzoic acid esters, for example ethyl benzoate; (N-alkyl)amidobenzoates, 1,3-diethers, 1,5-diethers, silyl esters, fluorenes, succinates and/or combinations thereof.

It is preferred to use so-called phthalate free internal donors because of increasingly stricter government regulations about the maximum phthalate content of polymers. This leads to an increased demand in phthalate free catalyst compositions. In the context of the present invention, "essentially phthalate-free" of "phthalate-free" means having a phthalate content of less than for example 150 ppm, alternatively less than for example 100 ppm, alternatively less than for example 50 ppm, alternatively for example less than 20 ppm, for example of 0 ppm based on the total weight of the catalyst.

The molar ratio of the internal donor relative to the magnesium can be from 0.02 to 0.5. Preferably, this molar ratio is preferably between 0.05 and 0.2.

Heterophasic Propylene Copolymer

The heterophasic propylene copolymer consists of a propylene-based matrix and a dispersed ethylene-α-olefin copolymer. The propylene-based matrix typically forms the continuous phase in the heterophasic propylene copolymer. The amounts of the propylene-based matrix and the dispersed ethylene-α-olefin copolymer may be determined by $^{13}$C-NMR, as well known in the art.

For example, the propylene-based matrix of the heterophasic propylene copolymer consists of a propylene homopolymer and/or a propylene-α-olefin copolymer consisting of at least 90 wt % of propylene and at most 10 wt % of α-olefin, based on the total weight of the propylene-based matrix.

The α-olefin is a C2 or C4-C12 α-olefin, that is an α-olefin having 2 carbon atoms or having 4 to 12 carbon atoms, such as for example ethylene, 1-butene, 1-pentene, 1-methyl-4-penthene, 1-hexene, 1-heptene or 1-octene and is preferably ethylene.

More preferably, the propylene-based matrix consists of a propylene homopolymer.

Preferably, the propylene-based matrix is present in an amount of 60 to 95 wt % based on the total heterophasic propylene copolymer.

For example, the dispersed ethylene-α-olefin copolymer is present in the heterophasic propylene copolymer (A') in an amount of 40 to 5 wt % based on the total heterophasic propylene copolymer, wherein the sum of the total amount of propylene-based matrix and total amount of the dispersed ethylene-α-olefin copolymer in the heterophasic propylene copolymer is 100 wt %.

The amount of ethylene in the ethylene-α-olefin copolymer is for example in the range of 20-65 wt % based on the ethylene-α-olefin copolymer. The amount of ethylene in the ethylene-α-olefin copolymer may be determined using $^{13}$C NMR as is known to the person skilled in the art.

The α-olefin in the ethylene-α-olefin copolymer is chosen from the group of ethylene and C3-C12 α-olefins, that is α-olefins having 3 to 12 carbon atoms. Preferably, the α-olefin is chosen from the group of α-olefins having 3 to 8 carbon atoms and any mixtures thereof, preferably the α-olefin in the ethylene-α-olefin copolymer is propylene.

Examples of heterophasic propylene copolymers (A') or heterophasic propylene copolymers (A) of the process of the invention that may be prepared with an even lower FOG value using the process of the invention include but are not limited to those disclosed in WO2015/091151 and in WO2015/091810.

In another aspect, the invention relates to the process of the invention further comprising the subsequent step of (II) visbreaking heterophasic propylene copolymer (A'), to obtain a heterophasic propylene copolymer (A) having a melt flow rate that is higher than the melt flow rate of the heterophasic propylene copolymer (A') as measured according to ISO1133 (2.16 kg, 230° C.), preferably wherein the shifting ratio, which is the ratio of the melt flow rate of the heterophasic propylene copolymer (A) to the melt flow rate of the heterophasic propylene copolymer (A') is in the range from 1.5 to 20, more preferably from 2 to 10, even more preferably from 3.5 to 8.0.

The term "visbreaking" is well known in the field of the invention. Visbreaking is also referred to as (peroxide) shifting or controlled rheology.

For example, methods of visbreaking polypropylene have been disclosed in U.S. Pat. No. 4,282,076 and EP 0063654.

Several different types of chemical reactions which are well known can be employed for visbreaking propylene polymers. An example is thermal pyrolysis, which is accomplished by exposing a polymer to high temperatures, e.g., in an extruder at 350° C. or higher. Another approach is exposure to powerful oxidizing agents. A further approach is exposure to ionizing radiation. It is preferred however that visbreaking is carried out using a peroxide. Such materials, at elevated temperatures, initiate a free radical chain reaction resulting in beta-scission of the polypropylene molecules. The visbreaking may be carried out directly after polymerisation and removal of unreacted monomer and before pelletisation (during extrusion in an extruder wherein shifting of the intermediate heterophasic propylene copolymer occurs). However, the invention is not limited to such an embodiment and visbreaking may also be carried out on already pelletised polypropylene, which polypropylene generally contains stabilisers to prevent degradation.

Examples of suitable peroxides include organic peroxides having a decomposition half-life of less than 1 minute at the average process temperature during step II). Suitable organic peroxides include but are not limited to dialkyl peroxides, e.g. dicumyl peroxides, peroxyketals, peroxycarbonates, diacyl peroxides, peroxyesters and peroxydicarbonates. Specific examples of these include benzoyl peroxide, dichlorobenzoyi peroxide, dicumyl peroxide, di-tert-butyl peroxide, 2,5-dimethyl-2,5-di(peroxybenzoato)-3-hexene, 1,4-bis(tert-butylperoxyisopropyl)benzene, lauroyl peroxide, tert-butyl peracetate, a,a'-bis(tert-butylperoxy)diisopropylbenzene (Luperco® 802), 2,5-dimethyl-2,5-di(tert-butylperoxy)-3-hexene, 2,5-dimethyl-2,5-di(tert-butylperoxy)-hexane, tert-butyl perbenzoate, tert-butyl perphenylacetate, tert-butyl per-sec-octoate, tert-butyl perpivalate, cumyl perpivalate, cumene hydroperoxide, diisopropyl benzene hydroperoxide, 1,3-bis(t-butylperoxy-isopropyl)benzene, dicumyl peroxide, tert-butylperoxy isopropyl carbonate and any combination thereof. Preferably, a dialkyl peroxides is employed in the process according to the present invention. More preferably, the peroxide is a,a'-bis-(tert-butylperoxy)diisopropylbenzene, 2,5-dimethyl-2,5-di(tert-butylperoxy)-hexane or 3,6,9-Triethyl-3,6,9-trimethyl-1,4,7-triperoxonane. Preferably, the peroxide is selected from the group of non-aromatic peroxides.

It can easily be determined by the person skilled in the art through routine experimentation how much peroxide should be used to obtain a composition having the desired melt flow rate. This also depends on the half-life of the peroxide and on the conditions used for the melt-mixing, which in turn depend on the exact composition.

Typically, the amount of peroxide used will lie in the range of 0.02 to 0.5 wt %, for example 0.08 to 0.2 wt %, for example 0.1 to 0.2 wt %, depending on the melt flow rate of the heterophasic propylene copolymer (A') and on the desired melt flow rate of the heterophasic propylene copolymer (A).

In order to achieve good mechanical properties as well as aesthetic properties, for example the tiger stripe rating of the heterophasic propylene copolymer (A) as compared to a heterophasic propylene copolymer (A') which has not been manufactured involving a step of visbreaking, the ratio of melt flow rate of the heterophasic propylene copolymer (A) to the melt flow rate of the heterophasic propylene copolymer (A') is preferably at least 1.1, for example at least 1.5, for example at least 2, for example at least 3.5 and/or for example at most 20, for example at most 15, for example at most 10, for example at most 8. For example, the shifting ratio is in the range from 1.5 to 20, more preferably from 2 to 10, even more preferably from 3.5 to 8.0.

For example, the shifting ratio may be chosen such that it complies with the following formula:

$$0.0011x^2 - 0.011x + 1 \leq \text{shifting ratio} \leq -0.0009x^2 + 0.1963x + 1 \quad \text{(formula 1)}$$

wherein x stands for the melt flow rate of the heterophasic propylene copolymer (A) obtained after visbreaking of the intermediate heterophasic propylene copolymer (A'), wherein the shifting ratio is the melt flow rate of the heterophasic propylene copolymer (A) divided by the melt flow rate of the heterophasic propylene copolymer (A').

Preferably, with such shifting ratio of formula (1) above, the heterophasic propylene copolymer (A') has a propylene-based matrix with a melt flow rate of at most 70 dg/min, for example of at most 50 dg/min as determined in accordance with ISO1133 (230° C., 2.16 kg).

The heterophasic propylene copolymer (A) obtained after step II) preferably has a melt flow rate of at least 40 dg/min, for example at least 50 dg/10 min or at least 60 dg/10 min, and/or at most 90 dg/min, for example at most 80 dg/min or at most 70 dg/min (ISO 1133, 230° C., 2.16 kg). Preferably, the melt flow rate of the heterophasic propylene copolymer (A) is in the range from 50 to 80 dg/min (ISO 1133, 230° C., 2.16 kg). A melt flow rate of the heterophasic propylene copolymer (A) of at most 80 dg/min or at most 70 dg/min is advantageous for even more reduced FOG values as typically a higher melt flow rate also increases the FOG value due to the presence of a larger low molecular weight fraction, which fraction can be more easily emitted from a composition/article prepared therefrom.

Preferably, the melt flow rate of the heterophasic propylene copolymer (A) as measured according to ISO1133 (2.16 kg, 230° C.) is in the range from 20 to 90 dg/min, preferably in the range from 40 to 70.

At the same time, however, a high melt flow rate is advantageous due to the trend to down-gauge: the desire to more efficiently produce materials with at least a similar property profile, e.g. producing with less material and/or by using less energy. In order to use less energy for injection molding, a higher melt flow rate of the polymer, in this case a heterophasic propylene copolymer is desired. A higher melt flow rate will enable faster injection molding and hence will reduce the energy needed per produced article. Also, it is a cost-effective solution as this allows for a shorter cycle time and therefore increases productivity.

Preferably, the FOG value of the heterophasic propylene copolymer (A) is at most 700 μg/g, for example at most 600 μg/g, for example at most 500 μg/g, for example at most 400 μg/g, for example at most 350 μg/g as determined by VDA 278.

In some embodiments, it is possible to further reduce the FOG value of the heterophasic propylene copolymer according to the invention by performing the step III) of maintaining the polypropylene obtained from step II) at an elevated temperature for a time sufficient to reduce the FOG value of the heterophasic propylene copolymer as determined in accordance with VDA 278. However, it will be appreciated that the present invention is also directed to a process without such step III).

Depending on the conditions at which the heterophasic propylene copolymer is maintained in step III), practical lower limits of the FOG values of the heterophasic propylene copolymer (B) or (B') obtained after step III) include at least 25 μg/g, at least 50 μg/g or at least 100 μg/g.

Therefore, in another aspect, the invention relates to a process, further comprising the step of III) reducing the FOG value of the heterophasic propylene copolymer (A') and/or the heterophasic propylene copolymer (A) by maintaining the heterophasic propylene copolymer (A') and/or the heterophasic propylene copolymer (A) at such temperature and for such time as to allow reduction of the FOG value to the desired level to produce a heterophasic propylene copolymer (B') and/respectively a heterophasic propylene copolymer (B).

Step III aims to further reduce the FOG-value and is a so-called venting step. Preferably, by such venting step, the heterophasic propylene copolymer (B') and/respectively a heterophasic propylene copolymer (B) has an FOG value of at most 400 µg/g, for example at most 350 µg/g, for example at most 300 µg/g, for example at most 250 µg/g as determined by VDA 278.

In another aspect, the invention relates to a heterophasic propylene copolymer obtained or obtainable by the process of the invention.

The heterophasic propylene copolymer (A'), (A), (B) or (B') may be combined with one or more reinforcing fillers and/or impact modifiers and/or further additives. Examples of such reinforcing fillers include organic fibers, such as aramid, carbon or polyester fibers; inorganic fibers such as glass fibres; inorganic reinforcing fillers such as talc or clay nanoparticles.

For example, the heterophasic propylene copolymer (A') or the heterophasic propylene copolymer (A) may be compounded with a reinforcing filler, such as talc, and thereafter maintained at an elevated temperature so as to reduce the FOG value.

Similarly the reinforcing filler may be added to the heterophasic propylene copolymer (B') or the heterophasic propylene copolymer (B).

Preferably, the heterophasic propylene copolymer is combined with less than 5 wt % of inorganic reinforcing fillers, more preferably, less than 4 wt %, even more preferably less than 3 wt %, even more preferably less than 2 wt %, even more preferably less than 1 wt %, even more preferably less than 0.5 wt %, even more preferably less than 0.3 wt %, even more preferably less than 0.1 wt %, most preferably less than 0.01 wt % inorganic reinforcing filler.

The heterophasic propylene copolymer obtained or obtainable by the process of the invention may be compounded with such further materials, e.g. reinforcing fillers, using methods known in the art.

Alternatively the heterophasic propylene copolymer (A'), (A), (B) or (B') may be combined with one or more of a glass multifibre filament strand, or roving, for example in an amount in the range of 10-40 wt %. Such may be accomplished by pulling such multifilament strand through a bath of molten thermoplastic material comprising or consisting of said heterophasic propylene copolymer. Alternatively the thermoplastic material comprising or consisting of said heterophasic propylene copolymer is applied as a sheath over said multifibre strand. Such a method is known for example from WO 2009/080821. The so sheathed or pulltruded continuous (glass) multifilament strands may be cut into pellets of desired length such as from 2-50 mm, 5-20 mm or 10-15 mm.

Here again the step of pultrusion or sheathing may be carried out using the heterophasic propylene copolymer (A'), (A), (B) or (B').

In yet another aspect, the invention relates to an article comprising the heterophasic propylene copolymer of the invention, wherein preferably the article is an automotive interior article such as instrument panel carriers, door panels, dashboards, dashboard carriers, door claddings, door fixtures, armrests, pillar cladding, seat cladding, boot cladding, interior trims and applications in heating, ventilation, air conditioning (HVAC) applications.

In yet another aspect, the invention relates to the use of the heterophasic propylene copolymer according to the invention for the manufacture of an automotive interior article such as instrument panel carriers, door panels, dashboards, dashboard carriers, door claddings, door fixtures, armrests, pillar cladding, seat cladding, boot cladding, interior trims and applications in heating, ventilation, air conditioning (HVAC) applications.

In yet another aspect, the invention relates to a process for the production of an article comprising the heterophasic propylene copolymer, wherein the article is preferably an automotive interior article such as instrument panel carriers, door panels, dashboards, dashboard carriers, door claddings, door fixtures, armrests, pillar cladding, seat cladding, boot cladding, interior trims and applications in heating, ventilation, air conditioning (HVAC) applications.

It will be understood that the description of the heterophasic propylene copolymer in this document applies to the heterophasic propylene copolymer (A'), as well as to the heterophasic propylene copolymer (A) (obtained after step II), as well as to the heterophasic propylene copolymer (B) or (B') (obtained after step III), unless otherwise stated.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

EXAMPLES

Measurements
Melt Flow Rate
Melt flow rate was determined in accordance with ISO 1133 at 230° C. and 2.16 kg.
RC, RCC2
RC is the rubber content (ethylene-propylene copolymer, so-called rubber phase) in the heterophasic propylene copolymer; RCC2 is the ethylene content in the rubber part of the heterophasic propylene copolymer. RC and RCC2 were measured using $^{13}$C-NMR according to known procedures.

FOG

FOG was determined according to VDA 278:2011 from pellets. FOG according to VDA 278 is the sum of all organic compounds of low volatility, which have an elution time greater than or equal to n-tetradecane. FOG is calculated as tetradecane equivalent (TE). FOG according to VDA 278 represents organic compounds in the boiling point range of n-alkanes $C_{14}$ to $C_{32}$. VDA standards are issued by "Verband der Automobilindustrie". The VDA standards used herein are available from Dokumentation Kraftfahrwesen (DKF); Ulrichstrasse 14, D-74321 Bietigheim-issingen, Germany or can be downloaded from their website (www.dkf-ev.de). Immediately after peroxide shifting (step II), samples were taken and sealed in Lamigrip aluminium bags from Fisher Scientific. The FOG values were measured within a week from sealing the bags. To allow a direct comparison, all VDA278 measurements were carried out on the same GC equipment.

Experimental

Catalyst I

Catalyst I is prepared according to the method disclosed in U.S. Pat. No. 4,866,022, hereby incorporated by reference. This patent discloses a catalyst component comprising a product obtained by: (a) forming a solution of a magnesium-containing species from a magnesium carbonate or a magnesium carboxylate; (b) precipitating solid particles from such magnesium-containing solution by treatment with a transition metal halide and an organosilane having a formula: $R_nSiR'_{4-n}$, wherein n=0 to 4 and wherein R is hydrogen or an alkyl, a haloalkyl or aryl radical containing one to about ten carbon atoms or a halosilyl radical or haloalkylsilyl radical containing one to about eight carbon atoms, and R' is OR or a halogen; (c) reprecipitating such solid particles from a mixture containing a cyclic ether; and (d) treating the reprecipitated particles with a transition metal compound and an electron donor. This process for preparing a catalyst is incorporated into the present application by reference.

Catalyst II

A. Grignard Formation Step

A stirred flask, fitted with a reflux condenser and a funnel, was filled with magnesium powder (24.3 g). The flask was brought under nitrogen. The magnesium was heated at 80° C. for 1 hour, after which dibutyl ether (DBE, 150 ml), iodine (0.03 g) and n-chlorobutane (4 ml) were successively added. After the colour of the iodine had disappeared, the temperature was raised to 80° C. and a mixture of n-chlorobutane (110 ml) and dibutyl ether (750 ml) was slowly added for 2.5 hours. The reaction mixture was stirred for another 3 hours at 80° C. Then the stirring and heating were stopped and the small amount of solid material was allowed to settle for 24 hours. By decanting the colorless solution above the precipitate, a solution of butylmagnesiumchloride (reaction product of step A) with a concentration of 1.0 mol Mg/l was obtained.

B. Preparation of the Intermediate Reaction Product 250 mL of dibutyl ether was introduced to a 1 L reactor fitted with a propeller stirrer and two baffles. The reactor was thermostated at 35° C. and the stirrer speed was kept at 200 rpm. Then a cooled (to 15° C.) 360 mL solution of the Grignard reaction product as prepared in A and 180 ml of a cooled (to 15° C.) solution of 38 ml of tetraethoxysilane (TES) in 142 ml of DBE were dosed into the reactor for 400 min. with preliminary mixing in a minimixer of 0.15 ml volume, which was cooled to 15° C. by means of cold water circulating in the minimixer jacket. The premixing time was 18 seconds in the minimixer and the connecting tube between the minimixer and the reactor. The stirring speed in the minimixer was 1000 rpm. On the dosing completion, the reaction mixture was kept at 35° C. for 0.5 hours. Then the reactor was heated to 60° C. and kept at this temperature for 1 hour. Then the stirring was stopped and the solid substance was allowed to settle. The supernatant was removed by decanting. The solid substance was washed three times using 300 ml of heptane. As a result, a white solid reaction product was obtained and suspended in 200 ml of heptane.

Under an inert nitrogen atmosphere at 20° C. a 250 ml glass flask equipped with a mechanical agitator is filled with a slurry of 5 g of the reaction product of step B dispersed in 60 ml of heptane. Subsequently, a solution of 0.86 ml methanol (MeOH/Mg=0.5 mol) in 20 ml heptane is dosed under stirring during 1 hour. After keeping the reaction mixture at 200° C. for 30 minutes the slurry was slowly allowed to warm up to 300° C. for 30 min and kept at that temperature for another 2 hours. Finally the supernatant liquid is decanted from the solid reaction product which was washed once with 90 ml of heptane at 300° C.

C. Preparation of the Catalyst

A reactor was brought under nitrogen and 125 ml of titanium tetrachloride was added to it. The reactor was heated to 90° C. and a suspension, containing about 5.5 g of the support obtained in step C in 15 ml of heptane, was added to it under stirring. The reaction mixture was kept at 90° C. for 10 min. Then ethyl benzoate was added (EB/Mg=0.15 molar ratio). The reaction mixture was kept for 60 min. Then the stirring was stopped and the solid substance was allowed to settle. The supernatant was removed by decanting, after which the solid product was washed with chlorobenzene (125 ml) at 90° C. for 20 min. The washing solution was removed by decanting, after which a mixture of titanium tetrachloride (62.5 ml) and chlorobenzene (62.5 ml) was added. The reaction mixture was kept at 90° C. for 30 min. After which the stirring was stopped and the solid substance was allowed to settle. The supernatant was removed by decanting, after which a mixture of titanium tetrachloride (62.5 ml) and chlorobenzene (62.5 ml) was added. Then di-n-butyl phthalate (DBP) (DBP/Mg=0.15 molar ratio) in 3 ml of chlorobenzene was added to reactor and the temperature of reaction mixture was increased to 115° C. The reaction mixture was kept at 115° C. for 30 min. After which the stirring was stopped and the solid substance was allowed to settle. The supernatant was removed by decanting, after which a mixture of titanium tetrachloride (62.5 ml) and chlorobenzene (62.5 ml) was added. The reaction mixture was kept at 115° C. for 30 min, after which the solid substance was allowed to settle. The supernatant was removed by decanting and the solid was washed five times using 150 ml of heptane at 600° C., after which the catalyst III, suspended in heptane, was obtained.

Catalyst III

Catalyst III is prepared according to the method described in U.S. Pat. No. 5,093,415 of Dow, hereby incorporated by reference. This patent discloses an improved process to prepare a catalyst including a reaction between titanium tetrachloride, diisobutyl phthalate, and magnesium diethoxide to obtain a solid material. This solid material is then slurried with titanium tetrachloride in a solvent and phthaloyl chloride is added. The reaction mixture is heated to obtain a solid material which is reslurried in a solvent with titanium tetrachloride. Again this was heated and a solid collected. Once again the solid was reslurried once again in a solution of titanium tetrachloride to obtain a catalyst.

Propylene Homopolymer Polymerization Experiments

Polymerization experiments of propylene homopolymers (Table 1) were performed on a bench-scale gas-phase reactor using catalysts I, II and III described above at different reaction temperatures (50, 60, 70 and 80° C.) as well as with different external electron donors in order to determine the effect of the reaction temperature on the FOG emission values of the propylene homopolymers. The pressure used was 22 bar. Triethylaluminium was used as co-catalyst, and two external electron donors were employed; di(iso-propyl) dimethoxysilane (DiPDMS) and n-propyltriethoxysilane (nPTES). Homopolymers produced at a temperature of 60° C. are denoted with CE as comparative experiments. Homopolymers produced at 50, 70 and 80° C. are denoted with RE as reference experiments of the present invention. RE and CE show the effects of the reaction temperature on the FOG emission values of polypropylene. At a given reaction temperature ($T_{R1}$, also referred in the present invention as T1), propylene homopolymers of melt flow rate 50 dg/min were produced at different H2/C3 molar ratios, due to the different hydrogen sensitivity of the external donors. H2/C3 is the molar ratio of hydrogen to propylene in the gas cap of the reactor, measured by on-line gas chromatography.

TABLE 1

Polymerization and FOG data of propylene homopolymers of melt flow rate 50 dg/min

| Exp # | Catalyst | External Donor | $T_{R1}$ ° C. | $H_2/C_3$ mol/mol | FOG µg/g |
|---|---|---|---|---|---|
| CE1 | I | nPTES | 60 | 0.029 | 710 |
| RE1 | I | nPTES | 80 | 0.0157 | 490 |
| CE2 | II | DiPDMS | 60 | 0.061 | 665 |
| RE2 | II | DiPDMS | 80 | 0.049 | 585 |
| CE3 | III | DiPDMS | 60 | 0.048 | 590 |
| RE3 | III | DiPDMS | 80 | 0.029 | 510 |
| RE41 | III | nPTES | 50 | 0.026 | 410 |
| CE4 | III | nPTES | 60 | 0.022 | 290 |
| RE42 | III | nPTES | 70 | 0.013 | 250 |
| RE43 | III | nPTES | 80 | 0.0054 | 190 |

From Table 1, it is clear that for a given melt flow of the propylene homopolymer, the increase in $T_{R1}$ reduces the FOG value, and this effect is independent of the catalyst/external donor system.

From Table 1, it is also shown that nPTES as compared to other external electron donors results in lower FOG emission values.

Moreover, it is clear from Table 1 that the combination of catalyst III and nPTES leads to the lowest FOG values at given MFR and given $T_{R1}$. This can be for example illustrated by comparing CE1/RE1 (catalyst I and nPTES) or CE3/RE3 (catalyst III and DiPDMS) with CE4/RE43 (catalyst III and nPTES).

Additional Examples are presented in Table 2 with the combination of catalyst III and nPTES for a series of propylene homopolymers produced at four different $T_{R1}$ (50, 60, 70 and 80° C., pressure 22 bar) with a melt flow rate of 30 dg/min.

TABLE 2

Polymerization and FOG data of propylene homopolymers of melt flow rate 30 dg/min

| Exp # | Catalyst | External Donor | $T_{R1}$ ° C. | $H_2/C_3$ mol/mol | FOG µg/g |
|---|---|---|---|---|---|
| RE51 | III | nPTES | 50 | 0.016 | 360 |
| CE5 | III | nPTES | 60 | 0.0149 | 280 |
| RE52 | III | nPTES | 70 | 0.008 | 220 |
| RE53 | III | nPTES | 80 | 0.0037 | 180 |

Same observations are made from Table 2 with respect to the positive effect of higher $T_{R1}$ decreasing the FOG emission value of the propylene homopolymers.

The findings from these results on propylene homopolymers can be applied for heterophasic propylene copolymers as is demonstrated below.

Heterophasic Propylene Copolymer Polymerization Experiments (No Pre-Polymerization)

Step I)

Two heterophasic propylene copolymers (Examples CE6C and RE6C) were produced by co-polymerization of propylene and ethylene using two reactors in series. In the first reactor, their respective propylene homopolymers (Examples CE6H and RE6H) were produced by varying the reaction temperature ($T_{R1}$) from 65° C. (Example CE6H) to 70° C. (Example RE6H). After polymerization of the propylene homopolymer matrix phase, the powder was transported from the first to the second reactor where the polymerization of the rubber phase consisting of an ethylene-propylene copolymer was done. Materials were prepared using the catalyst system composed of catalyst III and nPTES that shows the most promising results in terms of FOG emissions for propylene homopolymers (see Tables 1 and 2). The pressure in the first reactor was 23 bar, the pressure in the second reactor was 22 bar. Table 3 provides an overview of reactor powders that were prepared in this manner. MFR R1 represents the melt flow rate of the propylene homopolymer manufactured in the first reactor, whereas MFR R2 represents the melt flow rate of the intermediate heterophasic propylene copolymer, i.e. the heterophasic propylene copolymer powder. $T_{R1}$-$T_{R2}$ represents the difference of operating temperatures between the first reactor and the second reactor. RC represents the amount of rubber phase based on the total weight of the heterophasic propylene copolymer and was measured by $^{13}$C-NMR. The ethylene weight percentage of the ethylene-propylene rubber phase (i.e. RCC2) was set at 52 wt % for all the heterophasic propylene copolymers and was also measured by $^{13}$C-NMR.

TABLE 3

FOG data of PP homopolymers and respective intermediate heterophasic propylene copolymers (RCC2 52 wt %)

| Exp # | $H_2/C_3$ R1 mol/mol | MFR R1 dg/min | $T_{R1}$ ° C. | $T_{R2}$ ° C. | $T_{R1}$ - $T_{R2}$ ° C. | MFR R2 dg/min | RC wt. % | FOG µg/g |
|---|---|---|---|---|---|---|---|---|
| CE6H | 0.012 | 30 | 65 | — | — | — | — | 250 |
| CE6C | 0.012 | 30 | 65 | 62 | 3 | 12 | 23 | 265 |
| RE6H | 0.0085 | 30 | 70 | — | — | — | — | 210 |
| RE6C | 0.0085 | 30 | 70 | 62 | 8 | 12 | 23 | 215 |

From Table 3, it is clear that increasing $T_{R1}$ reduces FOG emissions of the intermediate heterophasic propylene copolymer, with $T_{R2}$ kept constant in the present examples at 62°

C. This can be observed when comparing Example RE6C and comparative Example CE6C together, both having the same composition but with the propylene homopolymer polymerized in the first reactor at a temperature of 70° C. and 65° C., respectively.

Step II)

For achieving high flow propylene heterophasic copolymers, these reactor powders (the intermediate heterophasic propylene copolymer powders) were melt-processed by peroxide shifting (i.e. visbreaking) to higher melt flow rates to obtain the final heterophasic propylene copolymer. This was done by feeding the powder to an extruder and adding Luperco 802PP40 as a peroxide (1,4-bis(2-tert-butylperoxy-propan-2-yl)benzene, CAS Registry Number: 2781-00-2) in different concentrations. Table 4 lists details of the visbreaking experiments for reactor powders CE6C and RE6C including starting MFR (intermediate MFR) and final MFR (target MFR), the amount of peroxide in weight percentage and FOG values. Besides the peroxide, some additives common in the art were also added (0.25 weight percentage). The additive package was the same for all experiments.

As also shown by the examples above and below, the shifting ratio is preferably chosen such that it complies with the following formula:

$$0.0011x^2 - 0.011x + 1 \leq \text{shifting ratio} \leq -0.0009x^2 + 0.1963x + 1$$

wherein x stands for the melt flow rate of the final heterophasic propylene copolymer obtained after visbreaking of the intermediate heterophasic propylene copolymer, wherein the shifting ratio is the melt flow rate of the final heterophasic propylene copolymer divided by the melt flow rate of the intermediate heterophasic propylene copolymer, wherein the melt flow rates are measured in accordance with ISO1133 (230° C., 2.16 kg).

Therefore, the present examples demonstrate that heterophasic propylene copolymers with decreased FOG emissions (with optionally a high flow) can be produced using the process of the invention.

TABLE 4

FOG data of PP impact base powders (the intermediate heterophasic propylene copolymer) and the peroxide shifted products (the final heterophasic propylene copolymer)

| Exp # | Intermediate MFR dg/min | Target MFR dg/min | Target MFR / Intermediate MFR | Peroxide wt. % | RC wt. % | FOG μg/g |
|---|---|---|---|---|---|---|
| CE6C | 12 | 12 | 1 | 0 | 23 | 265 |
| CE6C-S1 | 12 | 61 | 5.2 | 0.2 | 23 | 410 |
| RE6C | 12 | 12 | 1 | 0 | 23 | 215 |
| RE6C-S1 | 12 | 58 | 4.8 | 0.19 | 23 | 340 |

*CE6C-S1 is peroxide shifted heterophasic copolymers from experiment CE6C, RE6C-S1 is peroxide shifted heterophasic copolymers from experiment RE6C.
*intermediate MFR is the MFR of the intermediate heterophasic propylene copolymer
*target MFR is the MFR of the final heterophasic propylene copolymer
*shifting ratio is the target MFR divided by the intermediate MFR Table 4 shows that the visbreaking of an intermediate heterophasic propylene copolymer to higher melt flow rates to obtain the final heterophasic propylene copolymer commonly results in increased FOG values. This can be for example illustrated by comparing CE6C-S1 with CE6C, or also by comparing RE6C-S1 with RE6C.

However, it is also clear from Table 4 that the positive effect of increasing $T_{R1}$ during the polymerization process of the intermediate heterophasic propylene copolymer on lowering its FOG value is preserved when peroxide shifting the powder to higher melt flow rates to obtain the final heterophasic propylene copolymer. For instance, Example RE6C-S1 has lower FOG value than Example CE6C-S1, although both heterophasic propylene copolymers have the same composition and are both peroxide shifted from a melt flow 12 to about 60 dg/min; the only difference between the two examples is the temperature in the first reactor ($T_{R1}$) during the polymerization process of their respective intermediate heterophasic propylene copolymer; the higher $T_{R1}$, the lower the FOG value of the final heterophasic propylene copolymer.

The person skilled in the art knows how to vary the MFR value of the intermediate heterophasic propylene copolymer (for example by varying the MFR of the propylene homopolymer, by varying the MFR of the rubber phase or by varying the RC). As is shown above, the MFR value of the intermediate heterophasic propylene copolymer influences the FOG values for the desired MFR of the final heterophasic propylene copolymer.

Heterophasic Propylene Copolymer Polymerization Experiments (with Pre-Polymerization)

Step I)

Two heterophasic propylene copolymers (CE7C and RE7C) were produced by co-polymerization of propylene and ethylene using two reactors in series. Materials were prepared using the catalyst system composed of catalyst III and nPTES that shows the most promising results in terms of FOG emissions for propylene homopolymers (Tables 1 and 2). The comparative example (CE7C) was obtained using the typical two-step polymerization process with the propylene homopolymer matrix phase produced in the first reactor (CE7H) at a reference $T_{R1}$ of 65° C. and subsequently the ethylene-propylene copolymer produced in the second reactor at $T_{R2}$ of 62° C. to obtain the intermediate heterophasic propylene copolymer (CE7C). Whereas, the example of the present invention (RE7C) was obtained including a prepolymerization stage prior to the two-step polymerization process. During the prepolymerization stage, the catalyst components were contacted with the propylene monomer at a temperature of 25° C. for 10 minutes prior to feeding into the first polymerization reactor of the series. Then, the propylene homopolymer (RE7H) was produced at a higher temperature ($T_{R1}$) of 80° C. After polymerization of the propylene homopolymer matrix phase, the powder was transported from the first to the second reactor where the polymerization of the rubber phase consisting of an ethylene-propylene copolymer was done at the unchanged temperature ($T_{R2}$) of 62° C. Table 5 provides an overview of reactor powders that were prepared in this manner. MFR R1 represents the melt flow rate of the propylene homopolymer manufactured in the first reactor, whereas MFR R2 represents the melt flow rate of the intermediate heterophasic propylene copolymer powder, i.e. the propylene heterophasic copolymers. $T_{R1}$-$T_{R2}$ represents the difference of operating temperatures between the first reactor and the second reactor. RC represents the amount of rubber phase based on the total weight of the heterophasic propylene copolymer and was measured by $^{13}$C-NMR. The ethylene weight percentage of the ethylene-propylene rubber phase (i.e. RCC2) was set at 47 wt % for all the heterophasic propylene copolymers and was also measured by $^{13}$C-NMR.

TABLE 5

FOG data of PP homopolymers and respective heterophasic copolymers
(RCC2 47 wt %)

| Exp # | $H_2/C_3$ R1 mol/mol | MFR R1 dg/min | Prepol | $T_{R1}$ °C. | $T_{R2}$ °C. | $T_{R1}$ - $T_{R2}$ °C. | MFR R2 dg/min | RC wt. % | FOG µg/g |
|---|---|---|---|---|---|---|---|---|---|
| CE7H | 0.0123 | 36 | No | 65 | — | — | — | — | 260 |
| CE7C | 0.0123 | 36 | No | 65 | 62 | 3 | 11.5 | 27 | 275 |
| RE7H | 0.0047 | 36 | Yes | 80 | — | — | — | — | 160 |
| RE7C | 0.0047 | 36 | Yes | 80 | 62 | 18 | 11.5 | 27 | 170 |

From Table 5, it is clear that further increasing $T_{R1}$ by using of a prepolymerization stage reduces even more FOG emissions of the propylene heterophasic copolymers, with $T_{R2}$ kept constant at 62° C. This can be observed when comparing Examples CE7C and RE7C together, having the same composition but with the propylene homopolymer polymerized in the first reactor at a temperature of 65° C. with no prepolymerization and 80° C. including a prepolymerization stage, respectively. The use of prepolymerization enables to further increase $T_{R1}$ while avoiding fines and lumps formation in the first reactor, but also maintaining enough residual activity of the catalyst when entering the second reactor for incorporating the target amount of ethylene-propylene copolymer phase (i.e. RC).

Step II)

For achieving high flow propylene heterophasic copolymers, these reactor powders (the intermediate heterophasic propylene copolymer powders) were melt-processed by peroxide shifting (i.e. visbreaking) to higher melt flow rates to obtain the final heterophasic propylene copolymer as described above. Table 6 lists details of the visbreaking experiments for reactor powders CE7C and RE7C including starting MFR (intermediate MFR) and final MFR (target MFR), the amount of peroxide in weight percentage and FOG values. Besides the peroxide, some additives common in the art were also added (0.25 weight percentage). The additive package was the same for all experiments.

TABLE 6

FOG data of PP impact base powders (the intermediate heterophasic propylene copolymer)
and the peroxide shifted products (the final heterophasic propylene copolymer)

| Exp # | Intermediate MFR dg/min | Target MFR dg/min | $\dfrac{\text{Target } MFR}{\text{Intermediate } MFR}$ | Peroxide wt. % | RC wt. % | FOG µg/g |
|---|---|---|---|---|---|---|
| CE7C | 11.5 | 11.5 | 1 | 0 | 27 | 275 |
| CE7C-S1 | 11.5 | 60 | 5.2 | 0.2 | 27 | 425 |
| RE7C | 11.5 | 11.5 | 1 | 0 | 27 | 170 |
| RE7C-S1 | 11.5 | 61 | 5.3 | 0.21 | 27 | 305 |

*CE7C-S1 is peroxide shifted heterophasic copolymers from experiment CE7C, RE7C-S1 is peroxide shifted heterophasic copolymers from experiment RE7C.
*intermediate MFR is the MFR of the intermediate heterophasic propylene copolymer
*target MFR is the MFR of the final heterophasic propylene copolymer
*shifting ratio is the target MFR divided by the intermediate MFR Table 6 shows that the visbreaking of an intermediate heterophasic propylene copolymer to higher melt flow rates to obtain the final heterophasic propylene copolymer commonly results in increased FOG values. This can be for example illustrated by comparing CE7C-S1 with CE7C, or also by comparing RE7C-S1 with RE7C.

However, it is also clear from Table 6 that the positive effect of further increasing $T_{R1}$, through using a prepolymerization stage prior to the two-step polymerization process of the intermediate heterophasic propylene copolymer, on lowering its FOG value is preserved when peroxide shifting the powder to higher melt flow rates to obtain the final heterophasic propylene copolymer. For instance, Example RE7C-S1 has much lower FOG value than comparative Example CE7C-S1, although both heterophasic propylene copolymers have the same composition and are both peroxide shifted from 11.5 to about 60 dg/min; the only difference between the two examples is the temperature in the first reactor ($T_{R1}$) during the polymerization process of their respective intermediate heterophasic propylene copolymer; the higher $T_{R1}$, the lower the FOG emissions of the final heterophasic propylene copolymer.

Conclusion

Therefore, the present examples demonstrate that heterophasic propylene copolymers with decreased FOG emissions (with optionally a high flow) can be produced using the process of the invention.

The invention claimed is:

1. The process for the preparation of a heterophasic propylene copolymer consisting of a propylene-based matrix and a dispersed ethylene-α-olefin copolymer, comprising the steps of
    a) preparing the propylene-based matrix from propylene and optionally a C2 or C4-C12 α-olefin by contacting at least propylene and optionally C2 or C4-C12 α-olefin with a catalyst in a first gas-phase reactor at a temperature T1 and a pressure P1,
    b) subsequently preparing the dispersed ethylene-α-olefin copolymer from ethylene and a C3-C12 α-olefin by contacting the ethylene and the C3-C12 α-olefin with a catalyst in a second gas-phase reactor at a temperature T2 and a pressure P2,
    wherein T1-T2 is in the range from 6 to 25° C., wherein T1>T2,
    wherein P1 and P2 are in the range from 22 to 30 bar, to prepare a heterophasic propylene copolymer (A').

2. The process according to claim 1, wherein the melt flow rate of the heterophasic propylene copolymer (A') is in the range of 1.0 to 20.0 dg/min a measured according to ISO1133 (2.16 kg, 230° C.) and/or wherein the FOG value of the heterophasic propylene copolymer (A') is at most 500 μg/g, as determined by VDA 278.

3. The process according to claim 1, wherein the temperature T1 in the first gas-phase reactor is in the range from 60 to 75° C., or wherein the temperature T1 in the first gas-phase reactor is in the range from 70 to 85° C.

4. The process according to claim 1, wherein in step a) the propylene-based matrix is prepared by contacting the propylene, optional C2 or C4-C12 α-olefin and a prepolymer in the first gas phase reactor, wherein the prepolymer is prepared by contacting propylene and optional α-olefin with a catalyst in a prepolymerization reactor.

5. The process according to claim 1, wherein the catalyst in step a) and/or step b), is a catalyst system which comprises a Ziegler-Natta catalyst and at least one external electron donor.

6. The process according to claim 1, wherein the heterophasic propylene copolymer consists of
    (a) a propylene-based matrix,
    wherein the propylene-based matrix consists of a propylene homopolymer and/or a propylene-α-olefin copolymer consisting of at least 90 wt % of propylene and at most 10 wt % of α-olefin, based on the total weight of the propylene-based matrix and
    wherein the propylene-based matrix is present in an amount of 60 to 95 wt % based on the total heterophasic propylene copolymer and
    (b) a dispersed ethylene-α-olefin copolymer,
    wherein the dispersed ethylene-α-olefin copolymer is present in an amount of 40 to 5 wt % based on the total heterophasic propylene copolymer and
    wherein the sum of the total amount of propylene-based matrix and total amount of the dispersed ethylene-α-olefin copolymer in the heterophasic propylene copolymer is 100 wt %.

7. The process according to claim 1, wherein the amount of ethylene in the ethylene-α-olefin copolymer is in the range of 20-65 wt % based on the ethylene-α-olefin copolymer.

8. The process according to claim 1, wherein the α-olefin in the ethylene-α-olefin copolymer is chosen from the group of α-olefins having 3 to 8 carbon atoms and any mixtures thereof.

9. The process according to claim 1, wherein the propylene-based matrix consists of a propylene homopolymer.

10. The process according to claim 1, further comprising the subsequent step of (II) visbreaking heterophasic propylene copolymer (A'), to obtain a heterophasic propylene copolymer (A) having a melt flow rate that is higher than the melt flow rate of the heterophasic propylene copolymer (A') as measured according to ISO01133 (2.16 kg, 230° C.).

11. The process for preparation of a heterophasic propylene copolymer according to claim 10, wherein the melt flow rate of the heterophasic propylene copolymer (A) as measured according to ISO1133 (2.16 kg, 230° C.) is in the range from 20 to 90 dg/min.

12. The process for preparation of a heterophasic propylene copolymer according to claim 10, wherein the FOG value of the heterophasic propylene copolymer (A) is at most 700 μg/g, as determined by VDA 278.

13. The process for the preparation of a heterophasic propylene copolymer according to claim 10, further comprising the step of III) reducing the FOG value of the heterophasic propylene copolymer (A') and/or the heterophasic propylene copolymer (A) by maintaining the heterophasic propylene copolymer (A') and/or the heterophasic propylene copolymer (A) at such temperature and for such time as to allow reduction of the FOG value to the desired level to produce a heterophasic propylene copolymer (B') and/respectively a heterophasic propylene copolymer (B).

14. The process for the preparation of a heterophasic propylene copolymer according to claim 1, wherein the first and second gas-phase reactors are horizontal stirred gas-phase reactors.

15. The process according to claim 5, wherein the catalyst system is obtained by a catalyst preparation process comprising the steps of:
    (A) providing a procatalyst obtainable via a process comprising the steps of:
        i) contacting a compound $R^4_z MgX^4_{2-z}$ with an alkoxy- or aryloxy-containing silane compound to give a first intermediate reaction product, being a solid $Mg(OR^1)_x X^1_{2-x}$, wherein: $R^4$ is the same as $R^1$ being a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms; $X^4$ and $X^1$ are each independently selected from the group of consisting of fluoride (F—), chloride (Cl—), bromide (Br—) or iodide (I—);

ii) optionally contacting the solid $Mg(OR^1)_xX_{2-x}$ obtained in step i) with at least one activating compound selected from the group formed of activating electron donors and metal alkoxide compounds of formula $M^1(OR^2)_{v-w}(OR^3)_w$ or $M^2(OR^2)_{v-w}(R^3)_w$, to obtain a second intermediate product; wherein $M^1$ is a metal selected from the group consisting of Ti, Zr, Hf, Al or Si; $M^2$ is a metal being Si; v is the valency of $M^1$ or $M^2$; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms;

iii) contacting the first or second intermediate reaction product, obtained respectively in step i) or ii), with a halogen-containing Ti-compound and optionally an internal electron donor to obtain said procatalyst;

B) contacting said procatalyst with a co-catalyst and the at least one external electron donor to form a catalyst.

16. The process according to claim 1,
wherein the melt flow rate of the heterophasic propylene copolymer (A') is in the range of 1.0 to 20.0 dg/min a measured according to ISO1133 (2.16 kg, 230° C.) and wherein the FOG value of the heterophasic propylene copolymer (A') is at 400 µg/g, as determined by VDA 278,
wherein the temperature T1 in the first gas-phase reactor is in the range from 65 to 72° C. or wherein the temperature T1 in the first gas-phase reactor is in the range from 73 to 80° C.,
wherein in step a) the propylene-based matrix is prepared by contacting the propylene, optional C2 or C4-C12 α-olefin and a prepolymer in the first gas phase reactor, wherein the prepolymer is prepared by contacting propylene and optional α-olefin with a catalyst in a prepolymerization reactor,
wherein the catalyst in step a) and step b), is a catalyst system which comprises a Ziegler-Natta catalyst and at least one external electron donor, which external electron donor is chosen from the group of a compound having a structure according to Formula III $(R^{90})_2N$—$Si(OR^{91})_3$, a compound having a structure according to Formula IV: $(R^{92})Si(OR^{93})_3$ and mixtures thereof,
wherein each of $R^{90}$, $R^{91}$, $R^{92}$ and $R^{93}$ groups are each independently a linear, branched or cyclic, substituted or unsubstituted alkyl having between 1 and 10 carbon atoms,
wherein the catalyst system is obtained by a catalyst preparation process comprising the steps of:

A) providing a procatalyst obtainable via a process comprising the steps of:

i) contacting a compound $R^4_zMgX^4_{2-z}$ with an alkoxy- or aryloxy-containing silane compound to give a first intermediate reaction product, being a solid $Mg(OR^1)_xX^1_{2-x}$, wherein: $R^4$ is the same as $R^1$ being a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms; $X^4$ and $X^1$ are each independently selected from the group of consisting of fluoride (F—), chloride (Cl—), bromide (Br—) or iodide (I—);

ii) contacting the solid $Mg(OR^1)_xX_{2-x}$, obtained in step i) with at least one activating compound selected from the group formed of activating electron donors and metal alkoxide compounds of formula $M^1(OR^2)_{v-w}(OR^3)$, or $M^2(OR^2)_{v-w}(R^3)_w$, to obtain a second intermediate product; wherein $M^1$ is a metal selected from the group consisting of Ti, Zr, Hf, Al or Si; $M^2$ is a metal being Si; v is the valency of $M^1$ or $M^2$; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof;

iii) contacting the first or second intermediate reaction product, obtained respectively in step i) or ii), with a halogen-containing Ti-compound and optionally an internal electron donor to obtain said procatalyst;

B) contacting said procatalyst with a co-catalyst and the at least one external electron donor to form a catalyst;
wherein the heterophasic propylene copolymer consists of
(a) a propylene-based matrix,
wherein the propylene-based matrix consists of a propylene homopolymer and/or a propylene-α-olefin copolymer consisting of at least 90 wt % of propylene and at most 10 wt % of α-olefin, based on the total weight of the propylene-based matrix, and
wherein the propylene-based matrix is present in an amount of 60 to 95 wt % based on the total heterophasic propylene copolymer and
(b) a dispersed ethylene-α-olefin copolymer,
wherein the dispersed ethylene-α-olefin copolymer is present in an amount of 40 to 5 wt % based on the total heterophasic propylene copolymer and
wherein the sum of the total amount of propylene-based matrix and total amount of the dispersed ethylene-α-olefin copolymer in the heterophasic propylene copolymer is 100 wt %.

17. The process according to claim 1,
wherein the amount of ethylene in the ethylene-α-olefin copolymer is in the range of 20-65 wt % based on the ethylene-α-olefin copolymer,
wherein the α-olefin in the ethylene-α-olefin copolymer is chosen from the group of α-olefins having 3 to 8 carbon atoms and any mixtures thereof, preferably wherein the α-olefin in the ethylene-α-olefin copolymer is propylene, and
wherein the propylene-based matrix consists of a propylene homopolymer,
further comprising the subsequent step of (II) visbreaking heterophasic propylene copolymer (A'), to obtain a heterophasic propylene copolymer (A) having a melt flow rate that is higher than the melt flow rate of the heterophasic propylene copolymer (A') as measured according to ISO1133 (2.16 kg, 230° C.), preferably wherein the shifting ratio, which is the ratio of the melt flow rate of the heterophasic propylene copolymer (A) to the melt flow rate of the heterophasic propylene copolymer (A') is in the range from 2 to 10.

* * * * *